INVENTORS.
NILS J. HAAVIK &
GUNNAR NYBERG

ATTORNEYS

United States Patent Office 3,388,205
Patented June 11, 1968

3,388,205
APPARATUS FOR PRODUCING
ELECTRODE PASTE
Niles Johan Haavik, Nordstrand, Oslo, and Gunnar Nyberg, Vagsbygd, near Kristiansand, Norway, assignors to Elektrokemisk A/S, Oslo, Norway, a corporation of Norway
Filed Mar. 4, 1966, Ser. No. 531,700
5 Claims. (Cl. 13—23)

ABSTRACT OF THE DISCLOSURE

Solid carbonaceous material is separately preheated before being mixed with liquid tar or pitch binder. The preheating is carried out in a furnace having a plurality of upright sidewalls interconnected to provide a horizontal furnace cross-section in the shape of at least two connected wings which extend radially out from the central vertical axis of the furnace and which increase in width from their connection points to each other out to their terminal ends. Said terminal ends are coincident with some of said upright sidewalls and at least two electrodes are positioned in direct contact with a substantial portion of the interior surface area of two of said terminal end-upright sidewalls. Substantially uniform current density is achieved in the furnace for more uniform preheating of the carbonaceous charge.

This invention relates to production of electrode paste for electrodes in electric smelting furnaces and furnaces for melt-electrolytic production of aluminium. As is known, such paste consists of a carbonaceous raw material, as for instance anthracite, metallurgical coke or petrol coke, which is calcined and mixed with a binder as for instance tar and/or pitch. The calcined carbonaceous raw material, the so-called dry material, which has been crushed and screened to defined grain size, is mixed with liquid pitch and/or tar, whereupon the paste is baked in a separate furnace or in the same furnace in which the electrode is to be used.

The mixing of the electrode paste is usually carried out in a mixer which is equipped with heating elements so that the mixing may take place at temperatures of 150–200° C. The pitch and/or tar is supplied to the mixer in solid and cold state or in liquid state at temperatures of up to 200° C., while the dry material is supplied in cold state. The material supplied in cold state will go through the whole heating process in the mixer itself. The dry material is usually heated separately in the mixer before the binder is supplied. The heating of the batch in the mixer requires comparatively much time, and it is evident that such procedure represents a very uneconomical utilization of the mixing equipment, as a considerable part of the operating period is spent in pure heating. Such mixers are also comparatively expensive in purchase and maintenance.

There has now been found a method for better utilization of the mixer. According to this method the carbonaceous raw material for the electrode paste is preheated in a separate preheater in which the heating is effected by means of electric current which passes through the carbonaceous charge. The electric current is supplied to the material to be heated by means of electrodes which are built into the walls of the preheater and constitute a part of these walls. The preheated dry material while hot is then transferred to the mixer, in which it is mixed with cold solid or hot liquid pitch or tar which is supplied separately.

In carrying out the process of the present invention it was found that preheating of the carbonaceous dry raw material could not be carried out with the desired uniformity in an electric furnace of conventional configuration. With a furnace of the usual design the preheating is so uneven that differences in temperature of up to about 600° C. were found in the preheated material in the furnace. The carbonaceous material adjacent the electrodes was heated to very high temperatures while the material in the more remote area was at considerable lower temperatures.

This drawback in the uneven heating of the dry carbonaceous charge has now been overcome in accordance with the present invention by designing the preheater with a horizontal cross section which decreases in width as the distance from the electrode in the wall toward the center of the furnace is increased. As a result of this construction the desirable uniformity in the preheating of the dry carbonaceous material was achieved and the difference in the temperature of the material was reduced from about 600° C. to about 100° C. As we now understand it the reduction in the width of the cross section area of the furnace with increasing distance from the electrode toward the center of the furnace resulted in a much more even distribution of current density in the charge to give uniform preheating. As distinguished from this the current density in the charge of furnaces with conventional cross section area tends to be much greater adjacent the electrode as compared to the more remote areas toward the center of the furnace. Stated in another way a furnace made in accordance with the present invention has such a cross section that transverse sections through the current paths between the electrodes decrease in width with increasing distance from the electrodes toward the center of the furnace.

Satisfactory results have been achieved with a furnace in which the horizontal cross section is an approximate star or clover leaf with the electrodes built into the end wall of each arm or leaf. The electrical resistance will thus be very uniform within each arm, and a very even current distribution and consequently an even heat development will be obtained so that the temperature variations in the charge are decreased. The preheating is preferably carried out at an average temperature of about 150–250° C. When moist carbonaceous raw material is used, the preheater will also act as a dryer.

Further details of preferred constructions for the electric furnace of the present invention may best be understood by reference to the drawings in which.

Figure 1:
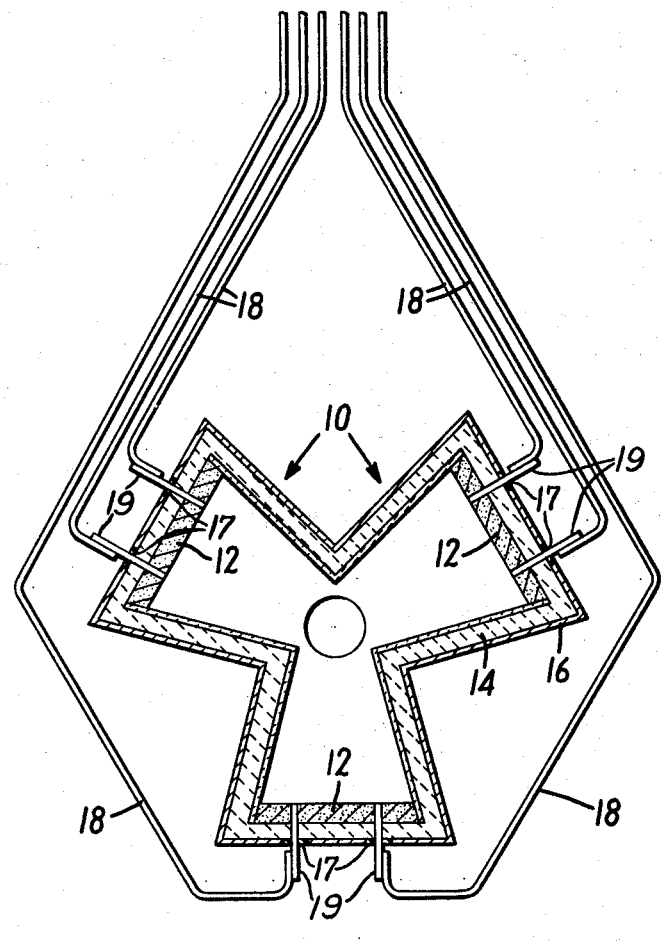
FIG. 1 is a schematic illustration of a horizontal cross section of a three phase electric preheating furnace.
Figure 2:
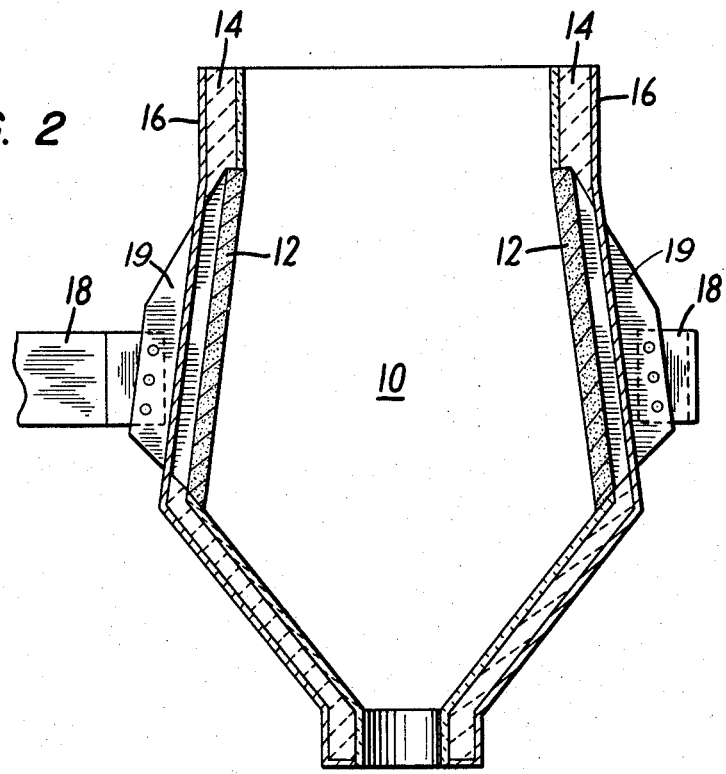
FIG. 2 is a longitudinal section through the furnace of FIG. 1.

Turning now to the drawings, 10 indicates an electric preheating furnace made in accordance with the present invention with horizontal cross section area generally in the form of a star or clover leaf so that the cross section area of the charge between the electrodes decreases in width as the distance from the electrode toward the center of the furnace is increased. More specifically, the horizontal cross-section of the furnace is in the shape of three interconnected wings each of which extends radially out from the central vertical axis of the furnace and each of which has sides, flanking its extension radius, which diverge from its connection points to an adjacent wing out to its terminal end. As a result vertical transverse sections through the current paths between the electrodes are substantially constant in area with increasing distance from the electrode to provide a more even current density throughout the charge in the furnace for uniform preheating of the charge. As shown the furnace is provided with electrodes 12 which are built into the interior surface of those upright sidewalls of the furnace which are coincident with the terminal ends of the winged cross-sections, such electrodes being made of graphite blocks or other conductive material to form at least a substantial portion of the total interior surface of each of such upright furnace sidewalls. The remainder of the furnace wall is made of the usual refractory material 14 which is an electric insulator and an outer metal or other casing 16 may be employed. One or more bus bars 18 supply the electric current from the transformers to the electrodes. Gaskets 17 of electrically-nonconductive material separate the members 19, connecting the electrodes 12 and bus bars 18, from the outer casing 16 to prevent short-circuiting when the casing is made of metal. In the furnace of FIG. 1 a three phase current supply is shown. Referring to FIG. 2 it will be seen that the walls which comprise the electrodes slope slightly outwardly and while this is preferred, it is not essential and the walls may be made generally parallel.

Figure 3:
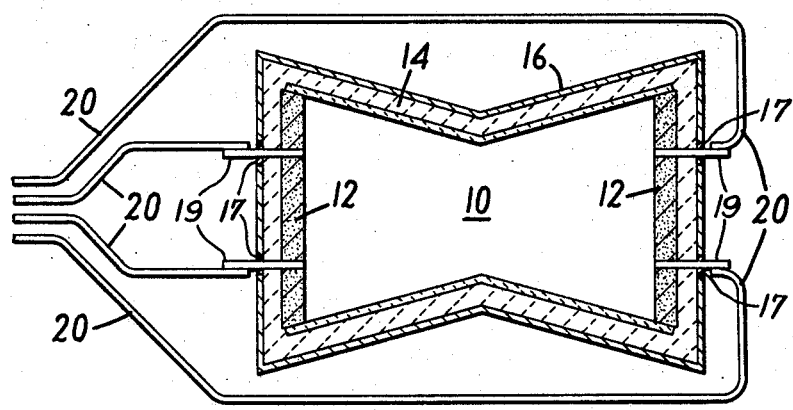
FIG. 3 illustrates a horizontal cross section of a preferred configuration for a two phase electric preheating furnace.

The furnace shown in FIG. 3 is identical to the furnace shown in FIGS. 1 and 2 except that only two electrodes 12 are employed in the furnace and single phase electric current is supplied to the electrodes by the bus bars 20. As in the case of the furnace of FIG. 1 the horizontal cross section area through the furnace is in the shape of interconnected wings each of which decreases in width as the distance from the electrode toward the center of the furnace is increased to provide a more uniform current density through the dry carbonaceous charge. For most desirable results the furnaces are operated continuously. They may, however, also be operated batchwise.

In an example of batch operation of the furnace of FIG. 1, 1400 kilograms of cold calcined petroleum coke containing less than 2% volatile matter is charged to the furnace. The size of the particles in the charge is such that all of it passes through a 3 mesh Tyler sieve and 40% of the particles pass through a 200 mesh Tyler sieve. After consumption of about 40–50 kwh. in about 6 minutes the temperature of the material discharging from the furnace is about 130° C. The hot preheated coke is then fed into a conventional mixer (not shown) in which it is mixed in conventional manner with about 20% of liquid pitch based on the weight of the preheated carbonaceous material to form the electrode paste. The liquid pitch was supplied to the mixture at a temperature of about 175° C.

It will be understood that the present invention is not to be limited to the cross sections illustrated in the drawings for as will be obvious to those skilled in the art any desired cross section configuration may be employed which will provide the desired uniformity of current density in the charge.

It will also be understood that it is intended to cover all changes and modifications of the preferred embodiments of the invention herein chosen for the purposes of illustration which do not depart from the spirit and scope of the invention.

We claim:

1. An electric furnace for heating carbonaceous material by passing electric current therethrough which comprises a plurality of upright sidewalls of electrically nonconductive refractory material surrounding an interior furnace space, said sidewalls being oriented with respect to each other in a configuration such that said interior furnace space has a horizontal cross-section in the shape of at least two wings which are connected to each other at common junction points and which extend radially out from the central vertical axis of said interior furnace space, the sides of each said wing, flanking its extension radius, diverging from said common junction points out to the terminus of said radius from said central vertical axis, each said wing terminus being coincident with the interior surface of one of said upright sidewalls, at least two electrodes in direct contact with substantial portions of the interior surfaces of two of said wing terminus-upright sidewalls for passing electric current through carbonaceous material placed in said interior furnace space, at least one opening for loading said carbonaceous material into said interior furnace space, and means for connecting said electrodes to an electrical source of energy, whereby said carbonaceous material may be heated in said furnace without differences in the temperatures of its respective parts therein greater than about 100° C.

2. An electric furnace as in claim 1 having three said wings each of which has a horizontal cross-section in the shape of a truncated triangle, said furnace being connected to a supply of three phase alternating current.

3. An electric furnace as in claim 1 having two said wings each of which has a horizontal cross-section in the shape of a truncated triangle.

4. An electric furnace as in claim 1 having an outlet passage in the base thereof.

5. An electric furnace as in claim 1 wherein the electrode portions of said wing terminus-upright sidewalls slope outwardly in the direction from higher to lower elevations thereof.

References Cited

UNITED STATES PATENTS

| | | | |
|---|---|---|---|
| 757,621 | 4/1904 | Horry et al. | 13—23 |
| 1,827,472 | 10/1931 | Hinter | 13—6 |
| 1,878,591 | 9/1932 | McIntosh | 13—6 |
| 1,933,527 | 10/1933 | Wadman | 13—6 |
| 2,281,408 | 4/1942 | Borel | 13—6 |

FOREIGN PATENTS

| | | |
|---|---|---|
| 434,833 | 3/1948 | Italy. |

RICHARD M. WOOD, *Primary Examiner.*

VOLODYMR Y. MAYEWSKY, *Examiner.*